Dec. 9, 1952    E. WILDHABER ET AL    2,620,709
METHOD OF AND APPARATUS FOR CUTTING AND CHAMFERING GEARS
Filed Sept. 17, 1946    3 Sheets-Sheet 1
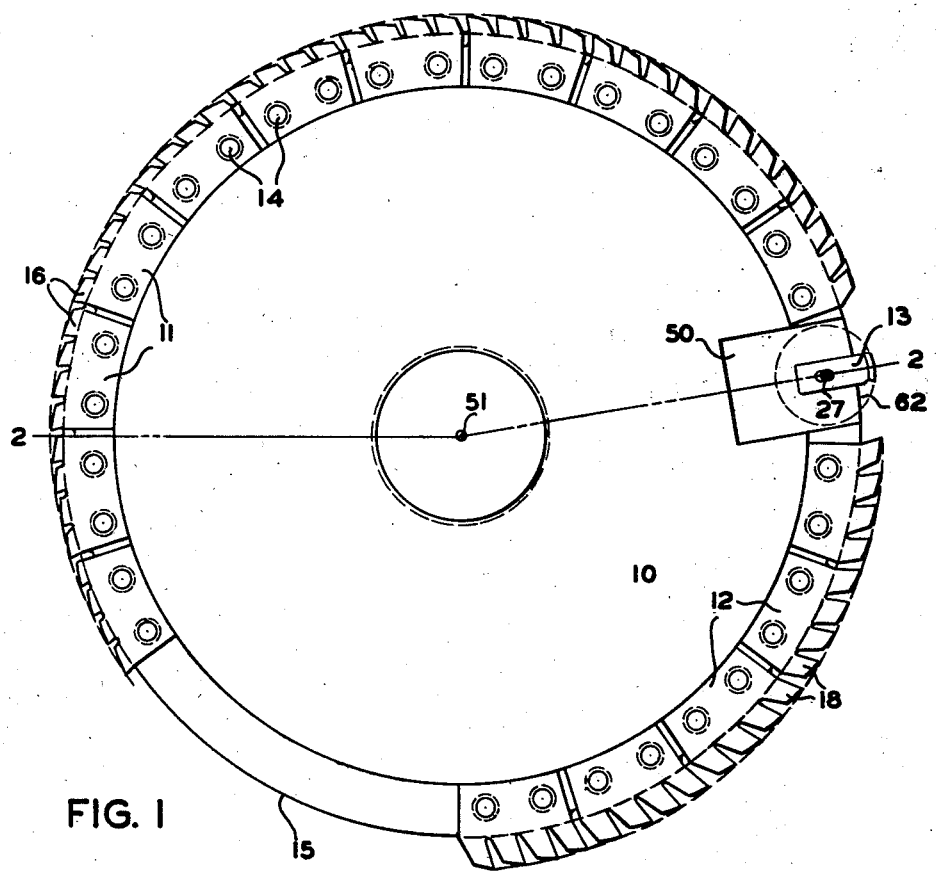
FIG. 1
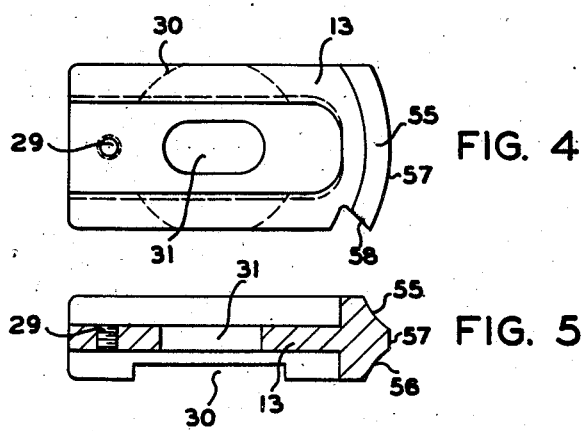
FIG. 4
FIG. 5
ERNEST WILDHABER AND
LEONARD O. CARLSEN
*INVENTOR.*
BY *B. Eshlinger*
Attorney Dec. 9, 1952     E. WILDHABER ET AL     2,620,709
METHOD OF AND APPARATUS FOR CUTTING AND CHAMFERING GEARS
Filed Sept. 17, 1946     3 Sheets-Sheet 2
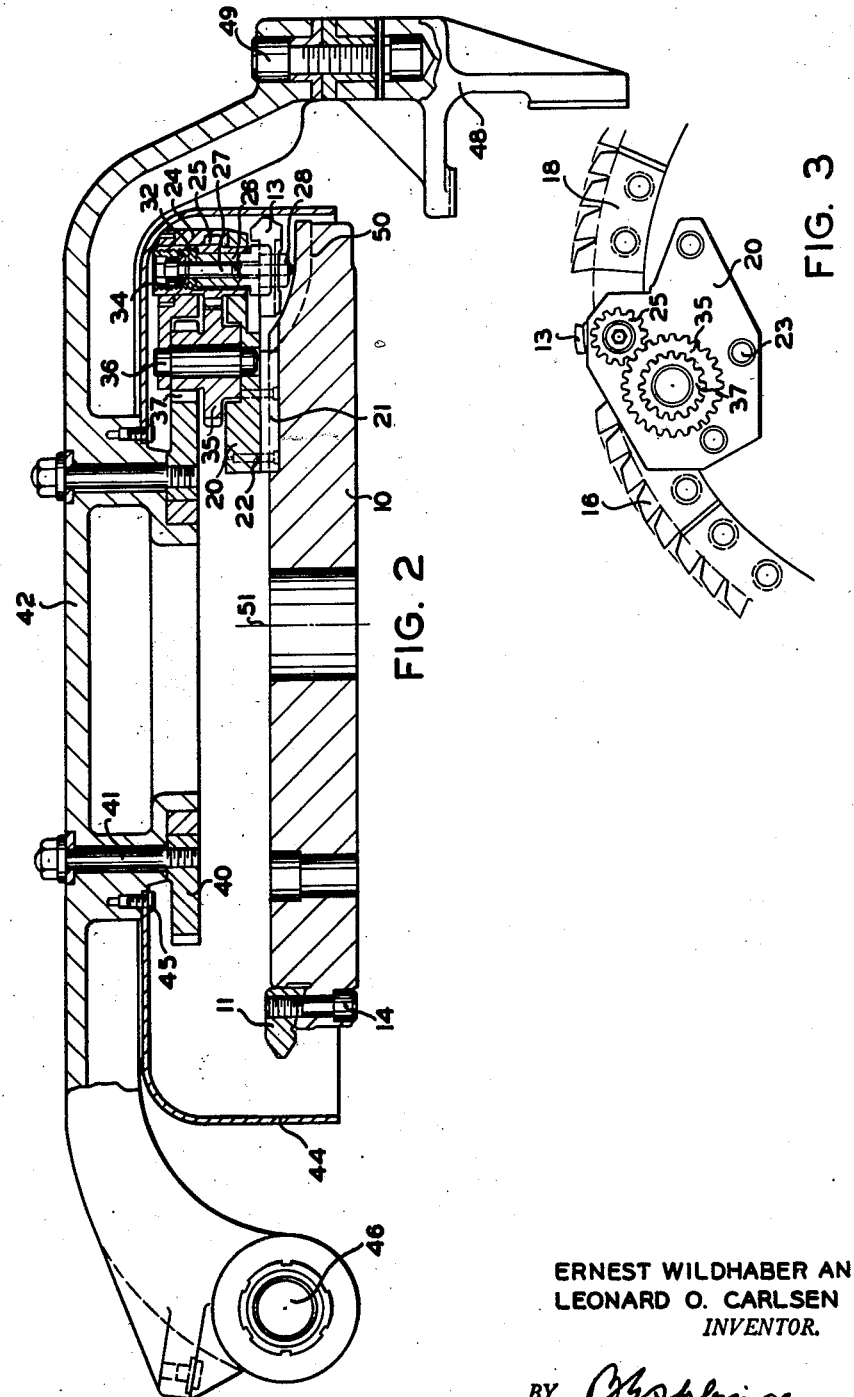
ERNEST WILDHABER AND
LEONARD O. CARLSEN
*INVENTOR.*

ERNEST WILDHABER AND
LEONARD O. CARLSEN
*INVENTOR.*

Patented Dec. 9, 1952

2,620,709

UNITED STATES PATENT OFFICE 2,620,709

METHOD OF AND APPARATUS FOR CUTTING AND CHAMFERING GEARS

Ernest Wildhaber, Brighton, and Leonard O. Carlsen, Rochester, N. Y., assignors to Gleason Works, Rochester, N. Y., a corporation of New York Application September 17, 1946, Serial No. 697,462

16 Claims. (Cl. 90—1.4)

1

The present invention relates to the production of gears and particularly to the production of bevel gears. In a more specific aspect, the invention relates to apparatus for and to a method for removing the burrs from the ends of the teeth, and of chamfering the teeth of straight bevel gears in the same operation with the cutting of the teeth.

In cutting the teeth of a gear, burrs are always formed at the ends of each tooth space where the cutting tool leaves the tooth space. These burrs are sharp and are liable to cut an operator's hands when he is handling the gear in removing it from the gear cutting machine and after it has been removed. In the tooth cutting operation, also, sharp corners are formed at the junctures of the ends and sides of the gear teeth and on bevel gears at the outer ends of the bottoms of the tooth spaces. If these corners are not removed, they are likely to chip off in the subsequent operation of heat-treating the gears to harden them, or they are liable to break off in use, and in this latter case they may get in between the teeth of the mating gears, causing noise, wear, and possible serious damage. For these reasons, it is the practice to remove the burrs from the gears and to chamfer the teeth as soon as possible after the tooth-cutting operation.

In some cases the burrs are removed and the sharp corners of the teeth eliminated by hand-filing. In the large production shops, however, the practice is to use machines for removing the burrs and chamfering. In any event, though, heretofore, the removing of the burrs from and the chamfering of the teeth of straight bevel gears has required a separate operation from the operation of cutting the teeth, and the burr-removal and chamfering have had to be done either by hand, or upon a separate machine from the tooth cutting machine after the teeth have been cut. It is possible to chamfer the teeth of spiral bevel or hypoid ring gears during the tooth-cutting operation, but separate tools are required for the tooth-cutting and chamfering operations, and these tools are actuated by different mechanisms and at different times in the cycle of producing the gear; a tooth space is cut, then the gear is indexed, and then a side of the tooth is chamfered. This process and the machine and tools employed are adapted, moreover, only to the chamfering of spiral bevel and hypoid ring gears. They are not suitable for the chamfering of spiral bevel or hypoid pinions. Moreover, in this process, only one side of a tooth can

2 be chamfered, and if it is desired to remove the burrs at the ends of the teeth, a still further tool has to be employed.

Where the operation of chamfering has to be performed in a separate machine from the cutting operation, extra handling is required both in putting the gear on and taking it off the chamfering machine, and moreover there is the cost of the special chamfering machine. Where only one side of a tooth is chamfered, there is always danger of the sharp corner at the outer end of the bottom of the tooth space chipping off. Moreover, there is some time loss if the chamfering operation is performed on the gear cutting machine in the intervals between tooth-cutting operations.

A primary object of the present invention is to provide apparatus for and a method of producing gears by which the chamfering operations may be performed simultaneously with the tooth-cutting operation.

Another object of the invention is to provide apparatus for and a method of producing gears through which the teeth may not only be chamfered in the same operation in which they are cut, but through which the burrs may also be removed from the ends of the teeth simultaneously with the chamfering operation.

A further object of the invention is to provide a method and apparatus for chamfering and removing the burrs from the teeth of gears in the same opeartion with the cutting of the teeth but without any increase in the time of the cutting operation.

A further object of the invention is to provide apparatus for chamfering and for removing burrs from gear teeth which may be applied to and used on existing gear-cutting machinery to effect chamfering and removal of burrs simultaneously with the tooth-cutting operation.

Still another object of the invention is to provide apparatus for chamfering and for removing burrs which can be used in conjunction with a conventional form of gear cutter to effect chamfering and removal of burrs during operation of that cutter.

A further object of the invention is to provide a modification of the process of the Wildhaber Patent No. 2,357,153 of August 29, 1944 through which chamfering and removal of the burrs from a tooth space may take place during the cutting of the tooth space without loss of cutting time and without interference with the cutting operation.

Still another object of the invention is to provide an attachment for a gear-cutting tool such as is employed in the process of the Wildhaber patent mentioned, which may be actuated from the cutting motion and in time therewith to chamfer and remove the burrs from a tooth space between the roughing and finish-cutting operations of the tool.

Another object of the invention is to provide a method of actuating a chamfering tool in time with a cutting cycle which will make possible the use of a simple tool and obviate any necessity for relieving the same.

Still further objects of the invention are to provide an improved method for chamfering and removing burrs from the teeth of gears, and a simple, cheap tool for this purpose.

Other objects of the invention will be apparent hereinafter from the specification and from the recital of the appended claims.

The invention is illustrated in the accompanying drawings as incorporated in a cutter such as disclosed in the Wildhaber patent above mentioned and as used in the process of that patent for cutting straight bevel gears. In this process, the tool employed is a disc cutter which has a plurality of roughing blades followed by a plurality of finishing blades arranged part-way around its periphery with a gap between the last and first blades. As the tool rotates on its axis, it is fed lengthwise of the tooth space to be cut in the gear blank, first in one direction and then in the other, the tooth space being roughed preferably during feed from the inner end of the tooth space to the outer end thereof and the tooth space being finished preferably during feed from the outer end of the tooth space to the inner end thereof. The cutter rotates, however, continuously in one direction during both roughing and finishing cuts. A tooth space of the blank is roughed and finished on each revolution of the cutter and the blank is indexed when the gap in the cutter is abreast of the blank.

Preferably, the present invention is employed in the process described by mounting between the last roughing blade and the first finishing blade of the cutter an attachment in which is journaled a single-blade fly-cutter which acts as a chamfering tool. For this purpose some of the roughing blades may be removed or the length of the indexing gap may be decreased. The fly-cutter is geared to a relatively stationary gear that is mounted coaxial of the tooth-cutting tool, so that as the tooth-cutting tool revolves, the fly-tool is revolved also. The tooth space of the gear blank is roughed out, as in prior practice, by feeding the rotating disc cutter from the small to the large end of the tooth, and the chamfering tool is so geared to the cutter rotation that just after the last roughing blade of the cutter has taken its cut, the fly tool comes into engagement with the tooth space and chamfers both sides and the bottom of the tooth space to remove simultaneously the burrs and sharp corners therefrom.

The gearing, which drives the fly cutter, is preferably so selected that the fly tool rotates in the opposite direction from the disc cutter. Hence, as the fly tool is taking its cut, the gear cutter, which carries it, is moving away from the work both through rotation of the cutter and through the direction of feed of the cutter at the final stage of the roughing feed movement. When the fly tool has completed its cut, the direction of feed of the disc cutter is reversed as in prior practice, and the tooth space is finished as in conventional practice. There is no burr left on the small end of the tooth space at the end of the finishing cut because with the preferred directions of rotation and feed of the gear cutter, the gear cutter takes a "climb" cut during the finishing operation.

Because in the described preferred embodiment, the overall motion of the chamfering tool is away from the work as it cuts, no relief of this tool back of its cutting edge is necessary. This makes the chamfering tool very simple and quite cheap.

In the drawings:

Fig. 1 is a plan view showing a disc type cutter for cutting straight bevel gears according to the Wildhaber patent above mentioned, as modified to permit use therewith of a fly-cutter-type chamfering tool for practicing the present invention;

Fig. 2 is an axial sectional view on the plane 2—2 of Figure 1 of this modified cutter, showing the fly tool mounted thereon, and showing the gearing which connects the fly tool with a relatively stationary part of the machine and which actuates the fly tool on rotation of the cutter;

Fig. 3 is a fragmentary plan view with the block 24 removed showing the chamfering tool attachment in position on the disc cutter and part of the gearing which actuates the chamfering tool;

Fig. 4 is a plan view and Fig. 5 is a section on an enlarged scale of the chamfering tool;

Figure 6:
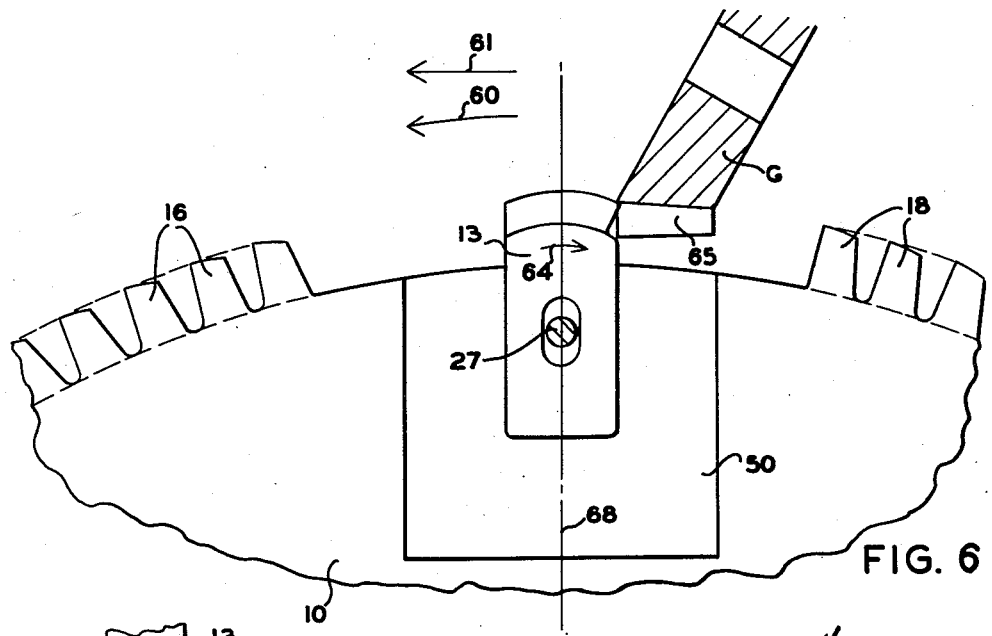
Figure 8:
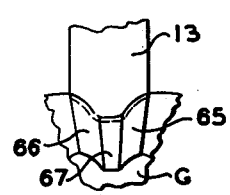
Figure 7:
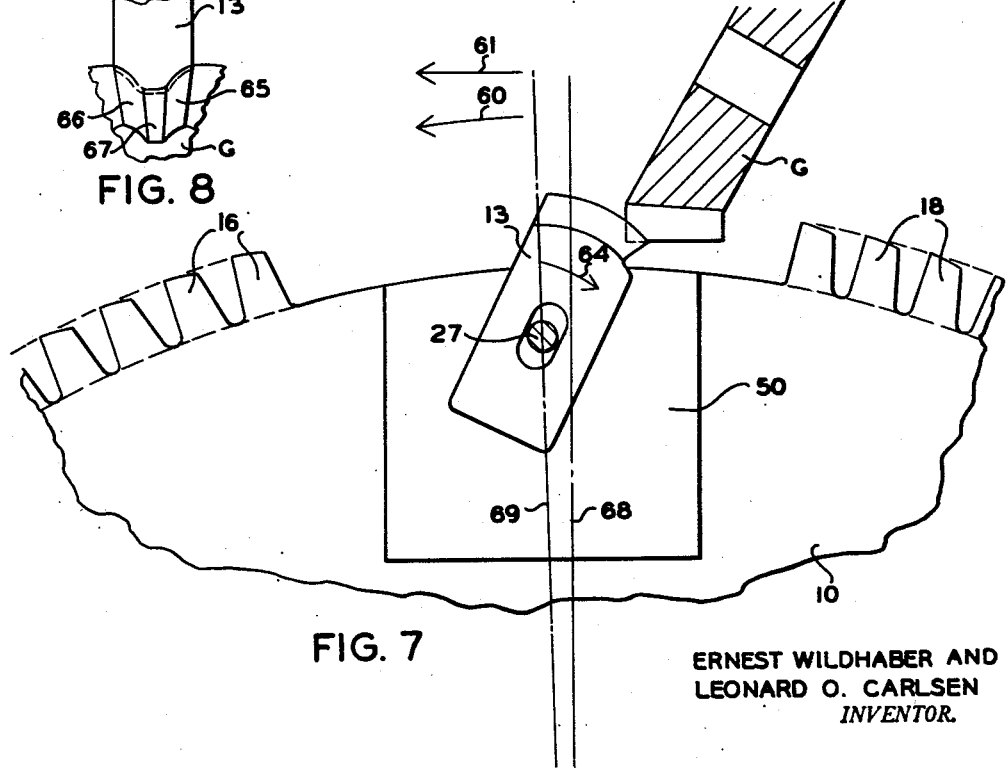

Figs. 6 and 7 are diagrammatic views showing successive positions of the combined gear cutter and chamfering tool in the operation of chamfering the outer end of a tooth space of a bevel gear blank; and Fig. 8 is a more or less diagrammatic view showing a tooth space of a bevel gear blank and further illustrating the action of the fly tool in removing the burrs and chamfering the sides and bottom of the tooth space at its outer end.

The combination gear cutting and chamfering tool shown in the drawings comprises a rotary head 10, a plurality of roughing segments 11, a plurality of finishing segments 12, and a fly cutter or chamfering tool 13. The roughing segments 11 and the finishing segments 12 may be of conventional structure and made as disclosed in Wildhaber Patent No. 2,357,153 above mentioned. Each has four cutting blades and in the embodiment shown, successive roughing blades 16 increase in height, as do successive finishing blades 18. Both the roughing and finishing blades are relieved according to conventional practice on their sides as well as their tips. The segments are secured to the cutter head by screws 14. Each of the blades has curved side-cutting edges at opposite sides shaped to cut the desired profile shape on the opposite sides of a gear tooth space as the cutter revolves and is fed in engagement with the work. Successive blades may be of the same circular arcuate profile shape, but may have the centers of curvature of their corresponding side cutting edges displaced from one another radially and axially of the cutter as described in said Wildhaber patent. There is a gap 15 between the last finishing blade and the first roughing blade. This gap serves to permit indexing the work after each revolution of the cutter as described in the Wildhaber patent.

The cutter of the present invention differs from the cutter disclosed in the Wildhaber patent mentioned in that one of the cutting segments is omitted, preferably the last roughing segment, and in its place there is secured a chamfering attachment. This attachment comprises a supporting block 20 (Figs. 2 and 3) which is secured to the cutter head 10 by screws 23 and keyed to the head 10 by the key 21. This key is secured to the support or block 20 by dowel-pins 22.

Journaled in the block 20 and in a block 24, which is secured thereto in any suitable manner, is a spur gear 25 having axially extending tubular portions at opposite sides which are suitably journaled in the plates 20 and 24, respectively. Mounted within the bore of the spur gear 25 for axial adjustment therein is a tool holder 26. The chamfering tool 13 is adapted to be secured to this tool holder by a bolt 27 and a nut 28. The nut 28 engages in a circular recess 30 (Fig. 5) formed in one side face of the rectangularly-shaped shank of the chamfering tool. The bolt 27 passes through an elongated slot 31 in the tool 13 and threads into nut 28. The tool holder 26 is formed at its bottom to receive and straddle the shank of the tool 13. The upper end of the shank portion of the tool holder is adapted to seat against an adjusting nut 32 which threads into the bore of the sleeve portion of spur gear 25, and the head of the bolt 27 fits into a recess formed in a nut 34 that also threads into the sleeve portion of gear 25 above nut 32. By adjusting nuts 32 and 34, chamfering tool 13 can be adjusted into proper alignment with cutting blades 16 and 18, and locked in position.

The spur gear 25 meshes with a spur gear 35 which is journaled on a stud 36 that is mounted in the plates 20 and 24. Integral with spur gear 35 is a spur pinion 37. This pinion meshes with a spur gear 40 that is secured by bolts 41 to the arm 42 which carries the guard or cover 44 for the cutter. This guard is secured to the arm 42 by screws 45. The arm 42 is adapted to pivot on a stud 46 for swinging the guard out of the way to permit access to the cutter, and it is provided with a rest 48, which is secured to it by a bolt 49 and which is adapted to seat on the frame of the machine to position the guard properly when it is over the cutter. This guard and its supporting arm may be like the cover and arm shown in the Wildhaber et al. Patent No. 2,288,058 of June 30, 1942 which shows a machine for practicing the invention of Wildhaber Patent No. 2,357,153. In fact, the present invention may be practiced on the machine of patent No. 2,288,058 without any change of the machine except for substitution of the apparatus of the present invention.

The cutter head 10 is recessed as denoted at 50 (Figs. 1 and 2) to provide clearance for the chamfering tool 13 so that it can rotate relative to the cutter head. The recess may be provided by milling a slot in the cutter head. The cutter is adapted to rotate on its axis 51 and may be driven through gearing such as described in patent No. 2,288,058.

The chamfering tool 13 has a cutting portion at one end of its shank whose opposite sides 55 and 56 are of curved profile shape conforming to the general shape of the tooth space which is to be chamfered, and whose tip surface 57 is a cylindrical surface. It has a front face 58 which is hooked, as shown in Fig. 4, so as to provide sharp cutting edges at the junctures of this face with the tip surface 57 and with the side surfaces 55 and 56 of the tool. The side surfaces 55 and 56, like the tip surface 57, are unrelieved and surfaces of revolution.

In producing a gear according to this invention, the cutter head 10 is rotated on its axis 51 and simultaneously fed along the length of a tooth space of the blank first in one direction and then in the other. As the cutter revolves on its axis 51, the chamfering tool 13 is also caused to rotate because the gear 40 is stationary, and, as the cutter revolves, the gear 37 revolves around gear 40 transmitting its motion through gears 35 and 25 to the tool 13. Preferably the gearing is so selected that the chamfering tool will rotate in the opposite direction from the cutter. The circle 62 (Fig. 1) indicates the motion of the chamfering tool 13 with reference to the recess 50 in the cutter head 10. The chamfering tool 13 may make several revolutions during a single revolution of the cutter head 10, but the gearing 25, 35, 37, 40 is so selected that when the last roughing blade 16 of the cutter head has taken its cut, the chamfering tool 13 will be in position to take its cut, as shown in Figs. 6 and 8. Here 65 and 66 denote, respectively, opposite sides of a tooth space of the gear blank G and 67 denotes the bottom of that space.

The arrow 60 (Figs. 6 and 7) denotes the direction of rotation of the cutter about its axis 51. During the time that the roughing blades 16 are cutting, the cutter is preferably fed relative to the gear blank G, which is to be cut, from the small to the large end of a tooth space as denoted by arrow 61. Just after the last roughing blade 16 has taken its cut at the large end of the tooth space, the chamfering tool, which, as denoted by arrow 64, is rotating in the opposite direction from the cutter, is rotated into position to engage the just-roughed tooth space of gear blank G. Its direction of rotation is such that it engages first at the bottom 67 of the tooth space of the blank and cuts upwardly and forwardly of the tooth space, removing the burrs from the bottom and sides of the tooth space and chamfering both the bottom 67 of the tooth space and the sides 65 and 66 thereof at the outer end of the tooth space. Fig. 7 shows the chamfering tool at the end of its chamfering cut. It has rotated from the position shown in Fig. 6 to that of Fig. 7 in the direction of the arrow 64 while the cutter head 10 has continued to rotate in the direction of the arrow 60 and be fed in the direction of the arrow 61. 68 denotes the center line of the cutter when it is at the position shown in Fig. 6, while 69 denotes the position which the center line occupies when the cutter is at the position shown in Fig. 7. The cutter has not only rotated but been moved bodily between the positions shown in Figs. 6 and 7, and these movements have been carrying the chamfering tool 13 away from the tooth space, which it is chamfering, during the very chamfering of that tooth space. It is this and the fact that the actual surface speed of the chamfering tool is greater than the speed of rotation of the cutter, that enables an unrelieved chamfering tool to be employed.

Immediately after the chamfering blade has completed its cut, the direction of feed of the cutter is reversed and the first of the finishing blades 18 comes into operative position. The cutter continues to rotate during finish-cutting in the direction of arrow 60, but is fed from the large to the small end of the tooth during the finishing operation, that is, in the opposite direction from arrow 61.

With the arrangement described, where the chamfering blade is positioned between the roughing and finishing blades to operate between the roughing and finishing cuts, the burr is removed at the end of the roughing operation, which is the operation during which it is formed. It is to be understood, however, that the present invention may be employed, also, where roughing and finishing cuts are separate operations. In this case, the chamfering tool would preferably be placed upon the roughing cutter after the final roughing blade.

While the invention has been described in connection with the production of straight tooth bevel gears, it is to be understood that it may be applied, also, to the cutting and chamfering of various other types of gears, also. Thus, it might be used directly with a disc-type cutter, such as disclosed in Wildhaber Patent No. 2,327,296 of August 17, 1943 for producing spur gears. Further than this, the invention may be adapted to use with other forms of cutting tools in the manufacture of spiral bevel, hypoid and other types of gears, as will be obvious to those skilled in the art.

It will further be understood that while the invention has been described in connection with use of a cutter which cuts and chamfers but one tooth space per revolution, it is obvious that for gears of small size, the blades might be so arranged as to cut and chamfer a plurality of tooth spaces per revolution. Thus, the cutter might have two identical sets of cutting blades, two identical chamfering tools and two identical indexing gaps and cut and chamfer two tooth spaces per revolution, the two sets of roughing blades and two sets of finishing blades, having each but half of the number of the corresponding blades shown in Fig. 1. The two chamfering tools could be actuated in the same way as described. The tool would then cut and chamfer one tooth space during one half a revolution, and cut and chamfer a succeeding tooth space during the other half of its revolution. Other modifications will be apparent.

In general, it may be said, then, that while the invention has been described in connection with a particular embodiment thereof and a particular use for that embodiment, it is capable of further modification and use, and this application is intended to cover any variations, uses, or adaptations of the invention following, in general, the principles of the invention and including such departures from the present disclosure as come within known or customary practice in the gear art, and as may be applied to the essential features hereinbefore set forth and as fall within the scope of the invention or the limits of the appended claims.

Having thus described our invention, what we claim is:

1. The method of chamfering a gear which comprises employing an unrelieved chamfering tool which has opposite side-cutting edges and a tip-cutting edge and which has a point-width greater than the width of the bottoms of the tooth spaces of the gear, and rotating said tool inwardly and upwardly with reference to a tooth space of a gear blank while moving the tool bodily longitudinally of the tooth space away from the tooth space, whereby to chamfer the bottom and opposite sides of the tooth space simultaneously.

2. Apparatus for producing gears comprising a support, a side-cutting tool movable on said support for cutting the side tooth surfaces of a gear blank, a chamfering blade mounted on the side-cutting tool to be movable independently thereof, means for imparting movement to the side-cutting tool to cut the side of a tooth of the work, and means operable by the relative movement of the side-cutting tool and its support for actuating the chamfering tool to effect chamfering of a tooth of the work.

3. Apparatus for producing gears comprising a tool having a rough-cutting portion, a finish-cutting portion, and a chamfering blade, means for moving the tool in one direction to rough-cut the side surfaces of a tooth space of a gear blank and for moving the tool in the opposite direction to finish-cut said side surfaces, and means actuated by the tool in its movement for effecting operative movement of the chamfering blade between operations of the rough-cutting and finish-cutting portions of the tool to chamfer the ends of the tooth surfaces.

4. Apparatus for producing gears comprising a support, a tool movable on the support and having a roughing blade for rough-cutting the sides of the teeth of a gear blank, a finishing blade for finish-cutting the sides of the teeth, and a chamfering blade mounted between the roughing and finishing blades and movable independently of the roughing and finishing blades and adapted to chamfer the ends of the teeth, means for moving the tool, and means actuated by the tool in its movement for effecting operative movement of the chamfering blade.

5. Apparatus for producing gears comprising a rotary tool having a plurality of rough-cutting blades for rough-cutting the sides of the teeth of a gear blank followed by a plurality of finish-cutting blades for finish-cutting the sides of the teeth of the blank, and having a chamfering blade interposed between the rough-cutting and finish-cutting blades which is movable independently of said rough-cutting and finish-cutting blades to chamfer the ends of the gear teeth, means for rotating the tool, and means operable by the tool in its rotation for moving the chamfering blade.

6. Apparatus for producing gears comprising a rotary tool having a plurality of rough-cutting blades followed by a plurality of finish-cutting blades with a chamfering blade interposed between the rough-cutting and finish-cutting blades and rotatable independently of the rotation of the tool, means for rotating the tool, and means operable by the tool in its rotation for rotating the chamfering blade.

7. Apparatus for producing gears comprising a rotary tool having a plurality of side-cutting blades secured thereto for cutting the sides of gear teeth and a chamfering blade mounted thereon to be rotatable independently of the side-cutting blades for chamfering the teeth, means for rotating the tool, and means for rotating the chamfering blade during the rotation of the tool.

8. Apparatus for producing gears comprising a rotary tool having a plurality of side-cutting blades secured thereto for cutting the sides of the teeth of a gear, and a chamfering blade which is mounted thereon to be movable independently of the side-cutting blades for chamfering the gear teeth, means for rotating the tool, and means operable on rotation of the tool for moving the chamfering blade.

9. Apparatus for producing gears comprising a rotary tool having a plurality of side-cutting blades secured thereto, and a chamfering blade mounted thereon to be rotatable independently of the tool, means for rotating the tool, and means operable on rotation of the tool for rotating the chamfering blade in the opposite direction from the rotation of the tool.

10. Apparatus for producing gears comprising a rotary disc-cutter having a plurality of radially disposed cutting blades for cutting the sides of the teeth of a gear arranged part-way around its periphery with a gap between the last and first blades to permit indexing of a gear blank when the gap is abreast of the blank, and having a chamfering tool for chamfering the ends of the gear teeth mounted thereon to rotate with the cutter but to be movable independently thereof.

11. Apparatus for producing gears comprising a rotary disc-cutter having a plurality of rough-cutting blades for rough-cutting the sides of the teeth of a gear followed by a plurality of finish-cutting blades for finish-cutting the sides of the gear teeth arranged part-way around its periphery with a gap between the last and first blades and having a chamfering tool mounted thereon to rotate with the cutter but to be movable independently thereof, said chamfering tool being adapted to chamfer the sides of the gear teeth and being disposed between the rough-cutting and finish-cutting blades.

12. Apparatus for producing gears comprising a rotary disc-cutter having a plurality of roughing blades followed by a plurality of finishing blades arranged part-way around its periphery with a gap between the last finishing blade and the first roughing blade and having a chamfering blade disposed between the roughing and finishing blades to be movable independently of the cutter, means for rotating the cutter, and means operable on rotation of the cutter for rotating the chamfering blade in the opposite direction to the rotation of the cutter.

13. Apparatus for producing gears comprising a rotary disc-cutter having a plurality of radially disposed cutting blades, a chamfering blade rotatably mounted on said cutter, and means operable on rotation of the cutter for rotating the chamfering blade in the direction opposite to the direction of rotation of the cutter.

14. Apparatus for producing gears comprising a support, a rotary gear cutting tool journaled on said support, a chamfering blade rotatably mounted on said tool, a stationary gear fixedly secured to said support, gearing connecting the chamfering blade to said stationary gear to rotate the chamfering blade as the tool rotates, and means for rotating the tool.

15. Apparatus for producing gears comprising a support, a rotary gear cutting tool journaled on said support, a chamfering blade rotatably mounted on said tool, a stationary gear fixedly secured to said support, gearing connecting the stationary gear to said chamfering blade to rotate the chamfering blade in the opposite direction from the rotation of the tool as the tool rotates on its axis, and means for rotating the tool.

16. Apparatus for producing gears comprising a support, a rotary gear cutting tool journaled on said support and having a plurality of rough cutting blades followed by a plurality of finish cutting blades arranged part way around its periphery with a chamfering blade disposed between the rough cutting and the finish cutting blades and with a peripheral gap between the last finish cutting blade and the first rough cutting blade, said chamfering blade being rotatably mounted on the tool, a stationary gear fixedly secured to said support, gearing connecting the chamfering blade to said stationary gear to rotate the chamfering blade in the opposite direction from the rotation of the tool as the tool rotates on its axis, and means for rotating the tool.

ERNEST WILDHABER.
LEONARD O. CARLSEN.

REFERENCES CITED

The following references are of record in the file of this patent:

UNITED STATES PATENTS

| Number | Name | Date |
|---|---|---|
| 1,976,984 | Condon et al. | Oct. 16, 1934 |
| 1,985,409 | Hill | Dec. 25, 1934 |
| 2,135,819 | Klix | Nov. 8, 1938 |
| 2,184,232 | Christman | Dec. 19, 1939 |
| 2,329,804 | Wildhaber | Sept. 21, 1943 |
| 2,343,407 | Galloway | Mar. 7, 1944 |
| 2,392,278 | Wildhaber | Jan. 1, 1946 |
| 2,438,329 | Wildhaber | Mar. 23, 1948 |
| 2,443,089 | Wildhaber | June 8, 1948 |